US012072019B2

(12) United States Patent
Komori

(10) Patent No.: US 12,072,019 B2
(45) Date of Patent: Aug. 27, 2024

(54) METHOD OF ADJUSTING DRIVE MECHANISM OF WIND TURBINE, AND METHOD OF ADJUSTING DRIVE MECHANISM

(71) Applicant: NABTESCO CORPORATION, Tokyo (JP)

(72) Inventor: Hirofumi Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 261 days.

(21) Appl. No.: 17/730,416

(22) Filed: Apr. 27, 2022

(65) Prior Publication Data

US 2022/0349384 A1 Nov. 3, 2022

(30) Foreign Application Priority Data

Apr. 30, 2021 (JP) ................................. 2021-077957

(51) Int. Cl.
*F16H 57/12* (2006.01)
*F16H 1/28* (2006.01)
*F03D 17/00* (2016.01)

(52) U.S. Cl.
CPC ........... *F16H 57/12* (2013.01); *F16H 1/2863* (2013.01); *F03D 17/00* (2016.05); *F16H 2057/125* (2013.01)

(58) Field of Classification Search
CPC .. F16H 57/12; F16H 1/2863; F16H 2057/125; F03D 7/04; F03D 15/00; F03D 15/101
See application file for complete search history.

(56) References Cited

U.S. PATENT DOCUMENTS

| 5,609,058 A | * | 3/1997 | Gnadt | .................. B23F 19/025 |
| | | | | 33/501.8 |
| 8,371,976 B2 | * | 2/2013 | Watanabe | ............... F16H 57/12 |
| | | | | 475/5 |

(Continued)

FOREIGN PATENT DOCUMENTS

| DE | 102018122538 A1 | 1/2020 |
| JP | 2015-140777 A | 8/2015 |

(Continued)

OTHER PUBLICATIONS

Extended European Search Report dated Sep. 29, 2022, issued in corresponding European Patent Application No. 22169995.2 (9 pgs.).

*Primary Examiner* — Bobby Rushing, Jr.
(74) *Attorney, Agent, or Firm* — Pillsbury Winthrop Shaw Pittman, LLP

(57) ABSTRACT

A method of adjusting a drive mechanism includes measuring backlashes between the ring gear and the plurality of drive devices, and determining about positions of the plurality of drive devices with reference to the ring gear based on the backlashes measured in the measurement step. The measurement step includes: aligning the pinion of one of the plurality of drive devices to face a reference position in a circumferential direction of the ring gear and measuring a backlash between the ring gear and the said one drive device; and aligning the pinion of another one of the plurality of drive devices to face the reference position of the ring gear by revolving the plurality of the drive devices relative to the ring gear, and measuring a backlash between the ring gear and the said another drive device different from the said one drive device whose backlash has been measured.

11 Claims, 9 Drawing Sheets

(56) References Cited

U.S. PATENT DOCUMENTS

2011/0299998 A1* 12/2011 Yoshida .............. F03D 7/0204
  416/246
2019/0186468 A1  6/2019 Nohara et al.
2019/0203697 A1* 7/2019 Nohara .................... F03D 7/04

FOREIGN PATENT DOCUMENTS

JP      2020148324 A  *  9/2020  .......... B25J 17/0258
WO  WO-2020259906 A1 * 12/2020  ........... F16H 1/2863

* cited by examiner

METHOD OF ADJUSTING DRIVE MECHANISM OF WIND TURBINE, AND METHOD OF ADJUSTING DRIVE MECHANISM

CROSS-REFERENCE TO RELATED APPLICATIONS

This application is based on and claims the benefit of priority from Japanese Patent Application Serial No. 2021-077957 (filed on Apr. 30, 2021), the contents of which are hereby incorporated by reference in its entirety.

TECHNICAL FIELD

The present disclosure relates to provide a method of adjusting a drive mechanism of a wind turbine, and a method of adjusting a drive mechanism.

BACKGROUND

A drive mechanism in which a plurality of drive devices operate in conjunction with each other to drive a movable portion has been known. For example, a wind power generation device disclosed in Japanese Patent Application Publication No. 2015-140777 is installed on the land or on the ocean, and it includes a tower serving as a support post for a power generator, a nacelle disposed on top of the tower and having the power generator enclosed therein, and a rotor disposed on one of the ends of the nacelle and made up by a hub and a blade for receiving wind and converting the received wind into rotational energy. The wind power generation device further includes yaw bearing gears provided in the tower and a plurality of yaw actuators provided in the nacelle as a plurality of drive devices. In this wind power generation device, the yaw bearing gear is engaged with pinion gears of the yaw actuators to output rotation from the yaw actuator, thereby rotating the nacelle relative to the tower in a yaw direction.

It is desirable that the drive mechanism including the plurality of drive devices is arranged such that a variation of loads among the plurality of drive devices becomes smaller. If the load variation between the plurality of drive devices is large, the life of the drive device(s) to which a large load is applied becomes short, and as a result, the life of the entire drive mechanism is shortened. Therefore, it is desired to provide a method of determining the positions of a plurality of drive devices and a method of adjusting the positions of the plurality of drive devices based on determination results.

SUMMARY

The present disclosure has been made in view of the above, and an object of the disclosure is to provide a method of determining the positions of a plurality of drive devices and a method of adjusting the positions of the plurality of drive devices.

According to one aspect of the disclosure, provided is a method of adjusting a drive mechanism for driving a movable portion of a wind turbine, the drive mechanism including a ring gear and a plurality of drive devices, each of the plurality of drive devices including a pinion that meshes with the ring gear and a drive unit that drives the pinion. The method includes: a measurement step of measuring backlashes between the ring gear and the plurality of drive devices; and a determination step of determining about positions of the plurality of drive devices with reference to the ring gear based on the backlashes measured in the measurement step. The measurement step includes at least: aligning the pinion of one of the plurality of drive devices to face a reference position in a circumferential direction of the ring gear and measuring a backlash between the ring gear and the said one of the plurality of drive devices whose pinion faces the reference position; and aligning the pinion of another one of the plurality of drive devices to face the reference position of the ring gear by revolving the plurality of the drive devices relative to the ring gear, the said another one of the plurality of drive devices being different from the said one of the plurality of drive devices whose backlash has been measured, and measuring a backlash between the ring gear and the said another one of the plurality of drive devices whose pinion faces the reference position.

The method of adjusting a driving device of a wind turbine according to the aspect of the disclosure further includes an obtainment step of obtaining variation information regarding a variation among distances from a rotation center of the ring gear that has a plurality of teeth to respective tips of the plurality of teeth.

In the determination step, the determination about the positions of the plurality of drive devices with reference to the ring gear may be performed based on the backlashes measured in the measurement step and the variation information obtained in the obtainment step.

In the method of adjusting a driving device of a wind turbine according to the aspect of the disclosure, the determination step may include evaluating a degree of variation among the positions of the plurality of drive devices with reference to the ring gear based on a relative standard deviation of the backlashes measured in the measurement step and a relative standard deviation of the distances from the rotation center of the ring gear to the respective tips of the plurality of teeth obtained in the obtainment step.

In the method of adjusting a driving device of a wind turbine according to the aspect of the disclosure, in the obtainment step, the variation information regarding the variation among the distances from the rotation center of the ring gear to the respective tips of the plurality of teeth may be obtained from at least one selected from the group consisting of information regarding a manufacturing tolerance of the ring gear, the backlash between a specific drive device and the ring gear measured at different circumferential positions of the ring gear, and an inspection result regarding a circumferential distortion of the ring gear.

In the method of adjusting a driving device of a wind turbine according to the aspect of the disclosure, the ring gear has a plurality of internal teeth. In the measurement step, the backlashes may be measured using, as a reference position, a position where the pinion engages with an internal tooth whose tip is located at the closest distance from a rotation center of the ring gear among the plurality of internal teeth.

In the method of adjusting a driving device of a wind turbine according to the aspect of the disclosure, the ring gear has a plurality of external teeth. In the measurement step, the backlashes may be measured using, as a reference position, a position where the pinion engages with an external tooth whose tip is located at the furthest distance from a rotation center of the ring gear among the plurality of external teeth.

In the method of adjusting a driving device of a wind turbine according to the aspect of the disclosure, each of the plurality of drive devices includes an actuator that outputs rotation and a speed reducer that decelerates rotation outputted from the actuator and transmits the decelerated output to the pinion. The measurement step may include a step of bringing a tooth of the pinion situated at the reference position and situated between a pair of reference teeth in contact with one of the pair of reference teeth, the pair of reference teeth being adjacent to each other in the circumferential direction of the ring gear, a step of outputting rotation by the actuator to the pinion to rotate the pinion, a step of measuring an amount of rotation outputted by the actuator until when the tooth of the pinion contacts the other of the pair of reference teeth, and a step of calculating the backlash between the pinion and the ring gear from the measured rotation amount, a backlash inside the speed reducer, and a reduction ratio of the speed reducer.

The method of adjusting a driving device of a wind turbine according to the aspect of the disclosure may further include an adjustment step of adjusting a position of the pinion based on a result of the determination step.

In the method of adjusting a driving device of a wind turbine according to the aspect of the disclosure, in the adjustment step, the position of the pinion of at least one of the plurality of drive devices may be adjusted to change its distance from a rotation center of the ring gear.

In the method of adjusting a driving device of a wind turbine according to the aspect of the disclosure, in the adjustment step, the position of the pinion may be adjusted so that a variation among backlashes between the plurality of drive devices and the ring gear becomes less than a reference value.

In the method of adjusting a driving device of a wind turbine according to the aspect of the disclosure, in the adjustment step, the position adjustment of the pinion of at least one of the plurality of drive devices may be performed while fixing a position of the pinion of another of the plurality of drive devices different from the drive device for which the pinion adjustment of the pinion is performed.

According to another aspect of the disclosure, provided is a method of adjusting a drive mechanism for driving a movable portion, the drive mechanism including a ring gear and a plurality of drive devices, each of the plurality of drive devices including a pinion that meshes with the ring gear and a drive unit that drives the pinion. The method includes: a measurement step of measuring backlashes between the ring gear and the plurality of drive devices; and a determination step of determining about positions of the plurality of drive devices with reference to the ring gear based on the backlashes measured in the measurement step. The measurement step includes at least: aligning the pinion of one of the plurality of drive devices to face a reference position in a circumferential direction of the ring gear and measuring a backlash between the ring gear and the said one of the plurality of drive devices whose pinion faces the reference position; and aligning the pinion of another one of the plurality of drive devices to face the reference position of the ring gear by revolving the plurality of the drive devices relative to the ring gear, the said another one of the plurality of drive devices being different from the said one of the plurality of drive devices whose backlash has been measured, and measuring a backlash between the ring gear and the said another one of the plurality of drive devices whose pinion faces the reference position.

Advantageous Effects

The present disclosure can provide a method of performing determination about the positions of a plurality of drive devices and a method of adjusting the positions of the plurality of drive devices.

DESCRIPTION OF EXAMPLE EMBODIMENT

Embodiments of the present disclosure will now be described with reference to the appended drawings. A method of adjusting a drive mechanism 1 of a wind turbine 10 will be described as an example of a method of adjusting a drive mechanism 1. However, the method of adjusting the drive mechanism 1 is not limited to being applied to the drive mechanism 1 of the wind turbine 10, and can be widely applied to any drive mechanism 1 equipped with a plurality of drive devices 2.

Figure 1:
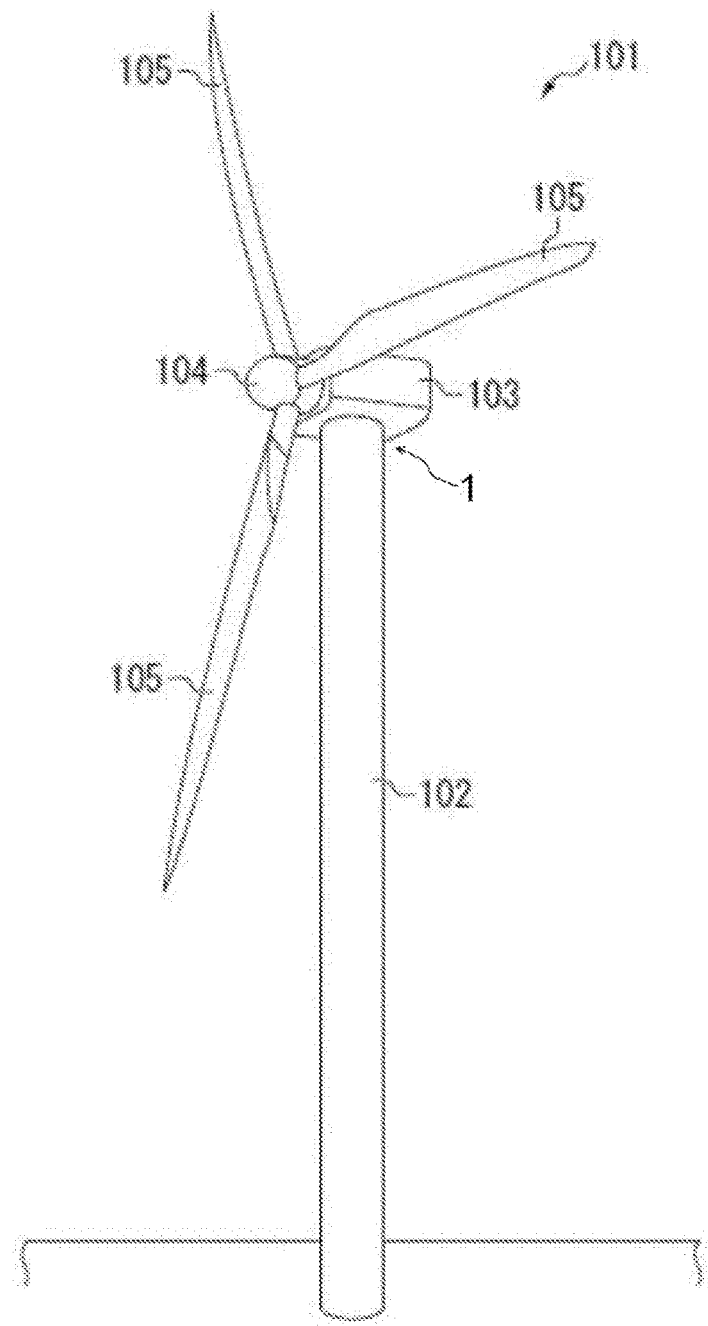
FIG. 1 is a perspective view showing an example configuration of a wind turbine according to an embodiment of the invention.

The wind turbine 10 including the drive mechanism 1 to which the adjustment method according to the embodiment is applied will now be described. FIG. 1 is a perspective view showing an example of the configuration of a wind turbine 10. The wind turbine 10 includes a wind turbine 101. The wind turbine body 101 includes a tower 102, a nacelle 103, a rotor (main shaft part) 104, and a plurality of blades (vanes) 105. The tower 102 extends vertically upward from the land or the sea.

The wind turbine 10 includes the drive mechanism 1 in addition to the wind turbine body 101. The wind turbine body 101 includes a movable portion configured to be driven by the drive mechanism 1. In the present embodiment, the nacelle 103 is attached to the top of the tower 102 such that the nacelle 103 is rotatable relative to the tower 102. In other words, the connecting portion between the tower 102 and the nacelle 103 constitutes the moving part configured to rotate the nacelle 103 relative to the tower 102. The drive mechanism 1 is configured to drive the movable portion, which in turn rotates the nacelle 103 relative to the tower 102. The drive mechanism 1 operates to rotate the nacelle 103 around the longitudinal axis of the tower 102. In this manner, the nacelle 103 rotates in the yaw direction (YAW) relative to the tower 102.

The rotor 104 rotates in the roll direction (ROLL) on the nacelle 103. The plurality (e.g., three) of blades 105 are provided on the rotor 104 at an equal angle relative to each other, so as to extend radially from the rotation axis of the roll direction.

Figure 2:
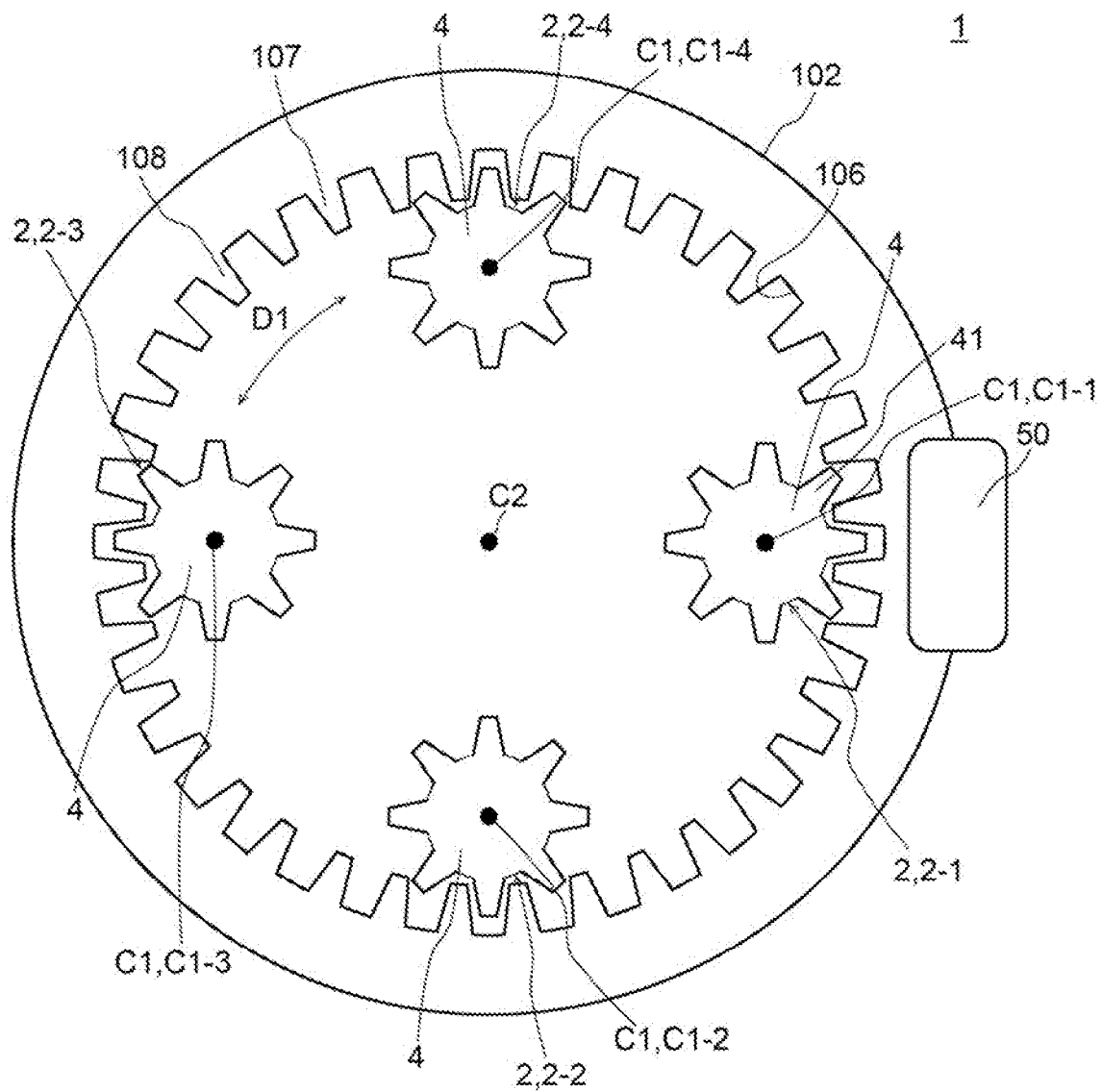
FIG. 2 is a top view of a drive mechanism according to the embodiment.

A description is now given of the drive mechanism 1. FIG. 2 is a top view of the drive mechanism 1 according to the embodiment. The drive mechanism 1 in the embodiment includes a ring gear 106, which will be described later, and the plurality of drive devices 2. The ring gear 106 has a plurality of teeth 107. Further, each of the plurality of drive devices 2 has a pinion 4 that meshes with the ring gear 106. In the example shown in FIG. 2, each of the pinions 4 of the plurality of drive devices 2 has a plurality of teeth 41, and the teeth 107 of the ring gear 106 and the teeth 41 of the pinion 4 mesh with each other. Further, each of the plurality of drive devices 2 has a drive unit 3 (not shown) for driving the pinion 4, as will be described later. In the embodiment, the drive device 2 is attached to the nacelle 103 to generate a yaw driving force. In the embodiment, four yaw drive devices 2-1, 2-2, 2-3, and 2-4 are mounted to the nacelle 103. When the drive devices 2 are attached to the nacelle 103, the drive unit 3 may be housed inside the nacelle 103.

These drive devices may be hereinafter collectively referred to simply as the "drive devices 2." Further, the direction in which the ring gear 106 rotates is also referred to as a circumferential direction D1.

The plurality of drive devices 2 operate in conjunction with each other to drive the movable portion. In the example of FIG. 2, the ring gear 106 is provided on the inner wall of the tower 102. In this case, as shown in FIG. 2, the ring gear 106 has a plurality of internal teeth 108 provided on the inner circumference as the plurality of teeth 107. The pinions 4 of the drive devices 2 mesh with the ring gear 106 formed on the inner wall of the tower 102. For the drive devices 2, the drive unit 3 drives the pinions 4 and rotate them about respective rotation axes C1. In other words, the rotation axis C1 of the pinion 4 is a rotation axis on which the pinion 4 is driven by the drive unit 3 to rotate. In the example of FIG. 2, the pinion 4 of a first drive device 2-1 rotates about a rotation axis C1-1, and the pinion 4 of a second drive device 2-2 rotates about a rotation axis C1-2, the pinion 4 of a third drive device 2-3 rotates about a rotation axis C1-3, and the pinion 4 of a fourth drive device 2-4 rotates about a rotation axis C1-4. The rotation of the pinion 4 causes the corresponding drive device 2 to move along the circumferential direction D1 of the ring gear 106. The move of the plurality of drive devices 2 in the circumferential direction D1 drives the movable portion between the tower 102 and the nacelle, and the nacelle 103 to which the plurality of drive devices 2 are attached is rotated in the yaw direction relative to the tower 102 on which the ring gear 106 is formed.

In the wind turbine body 101, a yaw unit configured to cause the nacelle 103 to yaw relative to the tower 102 includes a brake for applying a braking force to the drive devices, which are revolved relative to the ring gear 106. In the embodiment, the brake is a hydraulic brake attached to the nacelle 103 to apply a braking force to the ring gear 106. The hydraulic brake is, for example, a caliper brake mechanism. The hydraulic brake includes a hydraulic brake driving unit (not shown) and a friction member 50 shown in FIG. 2. In response to a control signal provided externally, the hydraulic brake driving unit moves the friction member 50 in a direction parallel to the rotation axis C1 of the pinion 4 in FIG. 2 (direction vertical to the paper surface of FIG. 2). The hydraulic brake driving unit applies a braking force to the ring gear 106 by urging the friction member 50 against the ring gear 106. The wind turbine 10 is preferably capable of adjusting the braking force applied to the ring gear 106.

Figure 3:
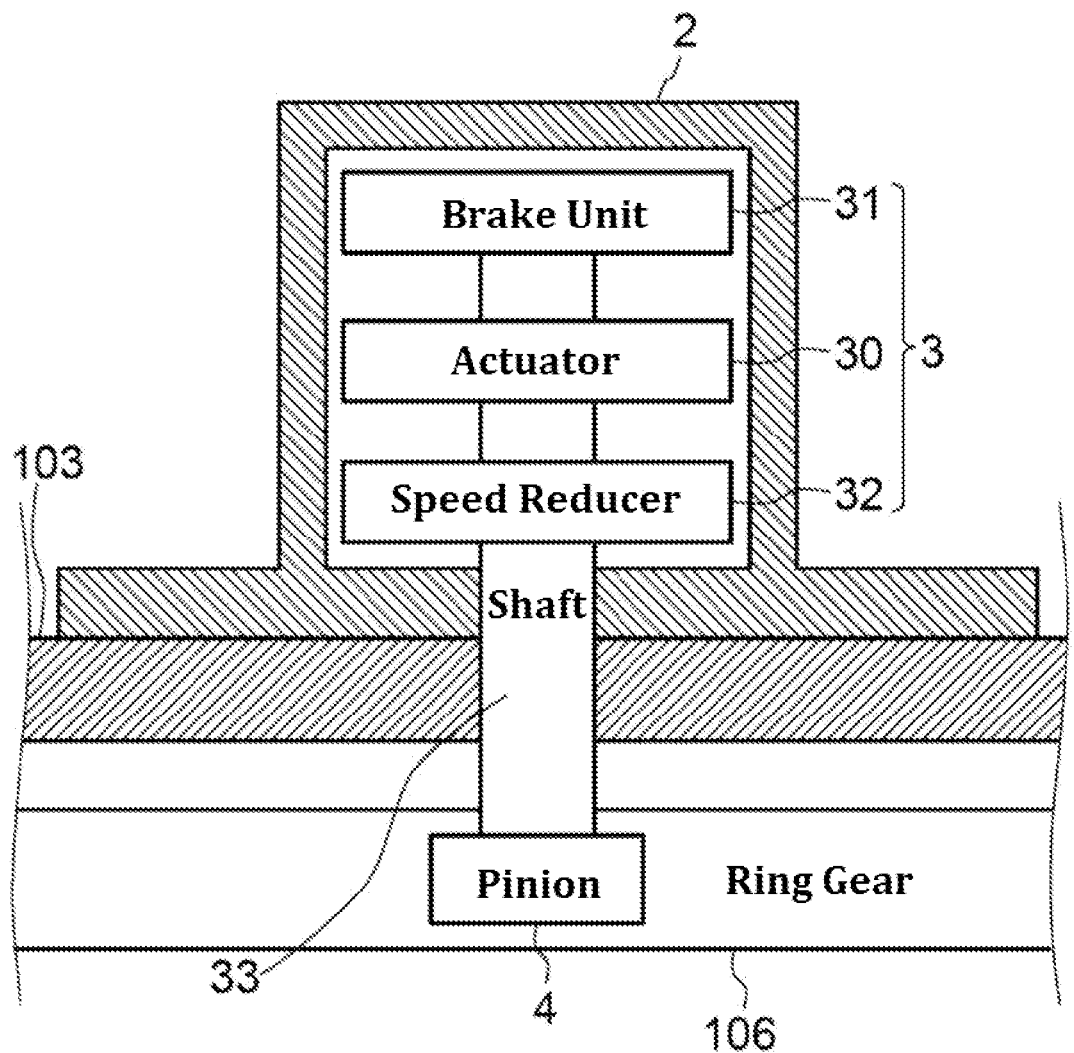
FIG. 3 shows a configuration example of a drive device according to the embodiment.

FIG. 3 shows a configuration example of the drive device 2. FIG. 3 is a schematic diagram in which the teeth 107 of the ring gear 106 and the teeth 41 of the pinion 4 are not shown. In the example of FIG. 3, the ring gear 106 is provided on the upper part of the tower 102.

Each of the plurality of drive devices 2 includes an actuator 30 that outputs rotation and a speed reducer 32 that decelerates the rotation outputted by the actuator and transmits the decelerated output to the pinion 4. In the embodiment, the actuator 30 and the speed reducer 32 are included in the drive unit 3 of the drive device 2. The drive unit 3 further includes a brake unit 31 and a shaft 33.

The actuator 30 is, for example, a motor. The actuator 30 rotates the shaft 33 about the longitudinal direction of the shaft 33 in accordance with the electric current supplied to the actuator 30.

The speed reducer 32 includes gears serving as a speed reducing mechanism. The speed reducer 32 uses the gears included in the speed reducer 32 to set the rotational speed of the shaft 33.

In the embodiment, the brake unit 31 is configured to reduce the rotational speed of the shaft 33 via an electromagnetic brake. The brake unit 31 may use the electromagnetic brake to maintain the suspended state of the rotation of the shaft 33.

The shaft 33 is driven by the actuator 30 to rotate at a rotational speed that is determined by the speed reducer 32. The output shaft 33, which is driven by the actuator 30, rotates with a predetermined torque (shaft torque). The pinion 4 rotates in mesh with the internal teeth of the ring gear 106 in accordance with the amount of rotation of the shaft 33. The pinion 4 is provided at an end of the shaft 33 in the drive unit 3. Thus, the pinion 4 rotates with the rotation of the shaft 33. As the actuators 30 rotate the pinions 4 via the shafts 33, the nacelle 103 rotates in the yaw direction relative to the tower 102 as described above.

As an example, the drive unit 3 is fixed to the nacelle 103 using a plurality of bolts (not shown).

A method of determining the positions of the plurality of drive devices 2 of the drive mechanism 1 described above and a method of adjusting the positions of the drive devices 2 will now be described.

The purpose of determining the positions of the plurality of drive devices 2 and adjusting the positions of the plurality of drive devices 2 will be first described.

When the plurality of drive devices 2 drive the movable portion, it is preferable that a backlash between the ring gear 106 and each of the plurality of drive devices 2 is same as each other. The reason of this is as follows. The smaller the backlash between the drive device and the ring gear 106 is, the deeper the teeth 41 of the pinion 4 of the drive device 2 meshes with the teeth 107 of the ring gear 106, and therefore the load applied to the drive device 2 is likely to become large. Conversely, the larger the backlash between the drive device and the ring gear 106 is, the shallower the teeth 41 of the pinion 4 of the drive device 2 meshes with the teeth 107 of the ring gear 106, and therefore the load applied to the drive device 2 is likely to become smaller. If the backlash between each of the plurality of drive devices 2 and the ring gear 106 varies, the load applied to the plurality of drive devices 2 also varies. By making the backlashes between the ring gear 106 and the plurality of drive devices 2 substantially uniform, the loads applied to the plurality of drive devices 2 can be made substantially uniform. As a result, it is possible to prevent loads from concentrating on some of the plurality of drive devices 2 and thereby it is possible to extend the life of the drive mechanism 1 as a whole. However, when the plurality of drive devices 2 drive the movable portion, the backlash between each of the plurality of drive devices 2 and the ring gear 106 may vary.

Figure 4:
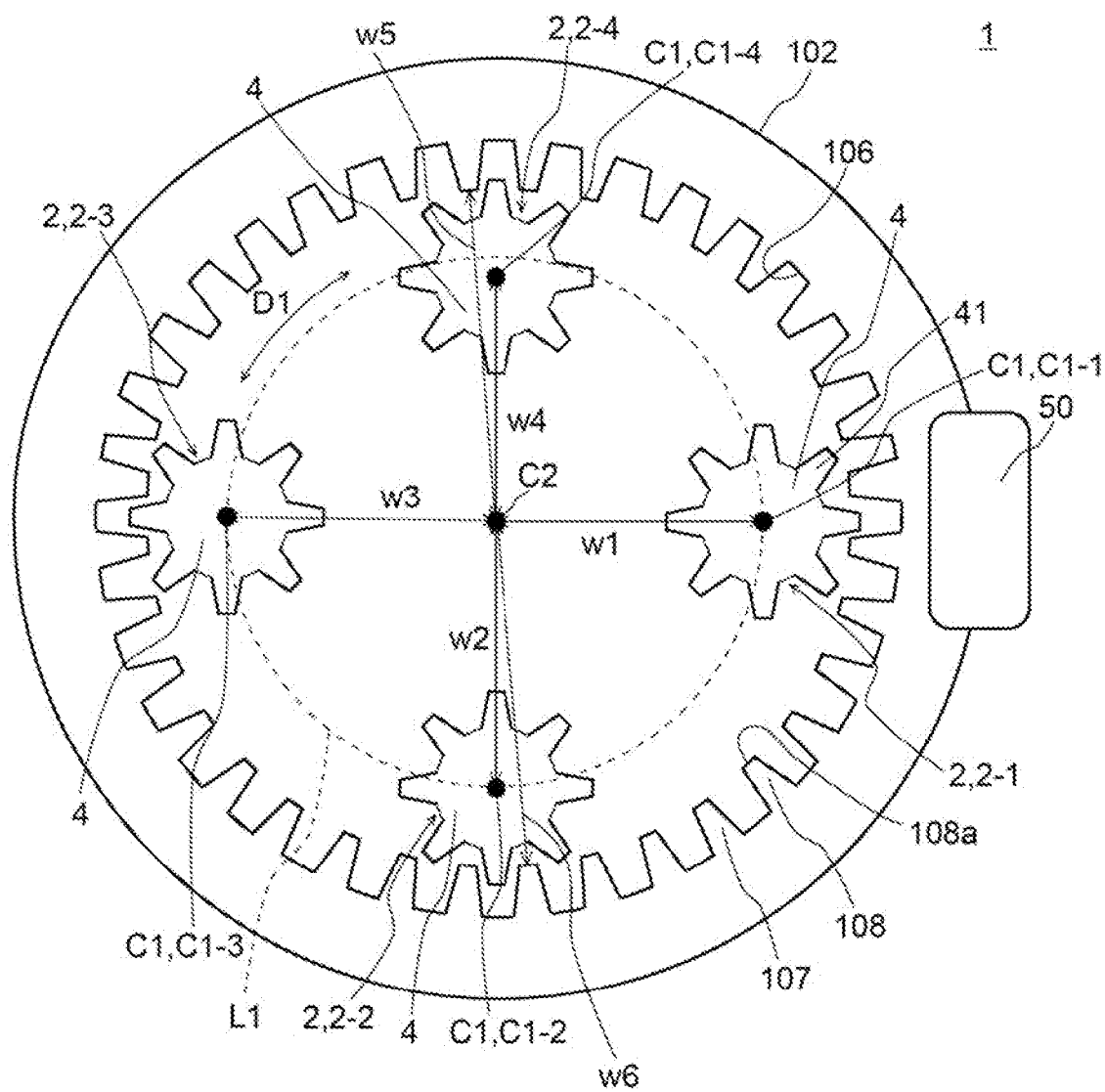
FIG. 4 is a top view showing an example of positions of a plurality of drive devices with reference to a ring gear according to the embodiment.

As one of the reasons for the backlash variation among the plurality of drive devices 2 meshing with the ring gear 106, variation of the positions of the plurality of drive devices 2 may be considered. FIG. 4 illustrates an example of the positions of the plurality of drive devices 2 with reference to the ring gear 106, and particularly shows how the positions of the plurality of drive devices 2 vary. In the example shown in FIG. 4, the distance of the rotation axis C1 of each pinion 4 from a rotation center C2 of the ring gear 106 varies. Here, the rotation center C2 of the ring gear 106 is an axis that is the center of an annulus if the ring gear 106 has a shape in which the plurality of teeth 107 are provided on the undistorted annulus. Alternatively, the rotation center C2 of the ring gear 106 can be defined as a straight line passing through the theoretical center of gravity of the ring gear 106 and perpendicular to the surface of the ring gear 106. The straight line, which is the rotation center C2 of the ring gear 106, is parallel to the rotation axis C1 of the pinion 4.

In the example of FIG. 4, the distance w4 between the rotation axis C1-4 of the pinion 4 of the fourth drive device 2-4 and the rotation center C2 of the ring gear 106 is different from the distance w1 between the rotation axis C1-1 of the pinion 4 of the first drive device 2-1 and the rotation center C2 of the ring gear 106, the distance w2 between the rotation axis C1-2 of the pinion 4 of the second drive device 2-2 and the rotation center C2 of the ring gear 106, and the distance w3 between the rotation axis C1-3 of the pinion 4 of the third drive device 2-3 and the rotation center C2 of the ring gear 106. In the example shown in FIG. 4, the distance w1, the distance w2, and the distance w3 are the same. The circle L1 shown in broken lines in FIG. 4 is a virtual circle centered on the rotation center C2 of the ring gear 106 and whose radius is equal to the length of the distance w1, the distance w2, and the distance w3.

When the ring gear 106 has the internal teeth 108, the tooth 41 of the pinion 4 having a longer distance from the rotation center C2 of the ring gear 106 to its own rotation axis C1 meshes deeper with the internal teeth 108 of the ring gear 106. Contrarily, the tooth 41 of the pinion 4 having a smaller distance from the rotation center C2 of the ring gear 106 to its own rotation axis C1 meshes shallower with the internal teeth 108 of the ring gear 106. Consequently, the drive device 2 with the pinion 4 having a larger distance from the rotation center C2 of the ring gear 106 to its own rotation axis C1 has a smaller backlash when mashing with the ring gear 106 than that of the drive device 2 with the pinion 4 having a smaller distance from the rotation center C2 of the ring gear 106 to its own rotation axis C1. In the example of FIG. 4, the distance w4 is smaller than the distance w1, the distance w2, and the distance w3. Therefore, in terms of the distance of the rotation axis C1 from the rotation center C2 of the ring gear 106, the backlash is likely to increase between the ring gear 106 and the drive device 2-4 compared with the drive device 2-1, the drive device 2-2, and the drive device 2-3.

By determining the positions of the plurality of drive devices 2, variations in the positions of the plurality of drive devices 2 can be detected as illustrated in FIG. 4. In this way, it is possible to detect the backlash variation among the plurality of drive devices 2 that mesh with the ring gear 106. By adjusting the positions of the plurality of drive devices 2, the backlashes between each of the plurality of drive devices 2 and the ring gear 106 can be made uniform.

As another reason for the backlash variation among the plurality of drive devices 2 meshing with the ring gear 106, considered is distortion of the shape of the ring gear 106. In the example of FIG. 4, the ring gear 106 is formed in a shape of a distorted annulus on which the plurality of internal teeth 108 are provided. Thus, the distance w5 from a tip 108a of one internal tooth 108 to the rotation center C2 of the ring gear 106 is different from the distance w5 from a tip 108a of another internal tooth 108 different from the one internal tooth 108 to the rotational center C2 of the ring gear 106. In this case, the backlash between the drive device 2 and the ring gear 106 is increased when the pinion 4 of the drive device 2 meshes with the internal tooth 108 having the tip 108a more distant from the rotation center C2 of the ring gear 106. In contrast, the backlash between the drive device 2 and the ring gear 106 is decreased when the pinion 4 of the drive device 2 meshes with the internal tooth 108 having the tip portion 108a closer to the rotation center C2 of the ring gear 106.

Here, when the distortion of the shape of the ring gear 106 is large, the variation among the backlashes between the plurality of drive devices 2 and the ring gear 106 is increased unless the variation among the positions of the plurality of drive devices 2 is made smaller. Whereas when the distortion of the shape of the ring gear 106 is small, even when there is some variation among the positions of the plurality of drive devices 2, the backlash variation among the plurality of drive devices 2 that mesh with the ring gear 106 as a whole is less likely to become large. Therefore, from the viewpoint of preventing the backlash variation among the plurality of drive devices 2 that mesh with the ring gear 106 from increasing while minimizing the adjustment of the positions of the drive devices 2, it is desirable to determine and adjust the positions of the plurality of drive devices 2 in consideration of the distortion of the shape of the ring gear 106.

The method of determining the positions of the plurality of drive devices 2 of the drive mechanism 1 described above and a method of adjusting the positions of the drive devices 2 will now be described. As an example, a method of determining the positions of the plurality of drive devices 2 of the drive mechanism 1 shown in FIG. 4 and a method of adjusting the positions of the plurality of drive devices 2 will be described. The adjustment method of the drive mechanism 1 according to the embodiment includes a measurement step of measuring backlashes between the plurality of drive devices 2 and the ring gear 106, and a determination step of determining the positions of the drive devices 2 with reference to the ring gear 106 based on the corresponding backlashes measured in the measurement step. Here, the adjustment method of the drive mechanism 1 may or may not further include an adjustment step of adjusting the positions of the drive devices 2 based on the result of the determination step. In the embodiment, an adjustment method for the drive mechanism 1 including the adjustment step will be described. Further, the adjustment method for the drive mechanism 1 according to the embodiment includes an obtainment step of obtaining variation information regarding the variation among the distances from the tips of the plurality of teeth 107 to the rotation center C2 of the ring gear 106.

The measurement step will be first described. In the measurement step, the backlash between each of the plurality of drive devices 2 and the ring gear 106 is measured. As an example, the backlash to be measured is a circumferential backlash between each of the drive devices 2 and the ring gear 106. The measurement step includes at least a step of measuring a backlash between the ring gear 106 and one of the plurality of drive devices 2 (hereinafter, also referred to as a first measurement step), and a step of measuring backlashes between the ring gear 106 and the others of the plurality of drive devices 2 (hereinafter, also referred to as a second measurement step).

Figure 5:
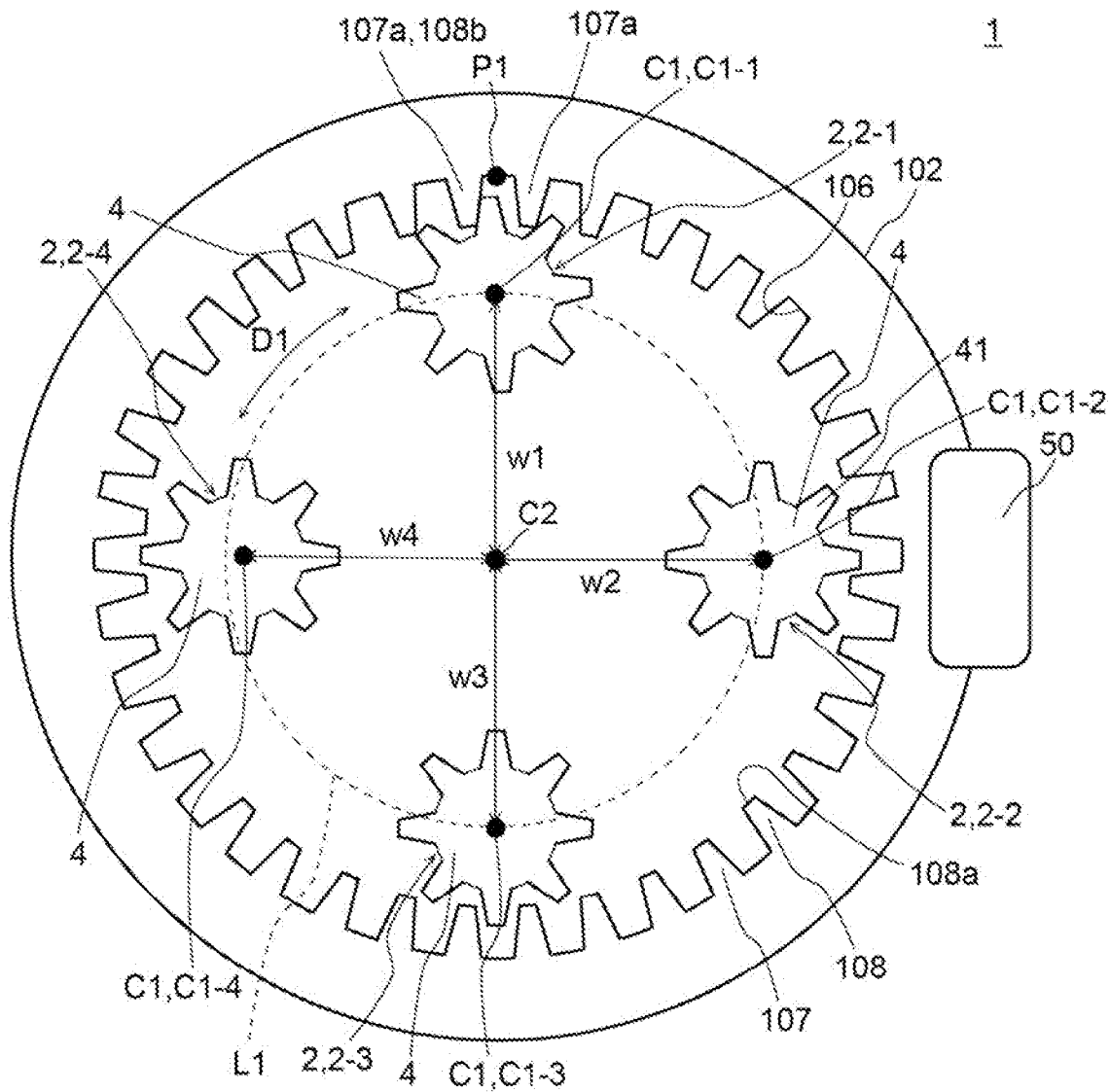
FIG. 5 is a top view illustrating a measurement step according to the embodiment.
Figure 6:
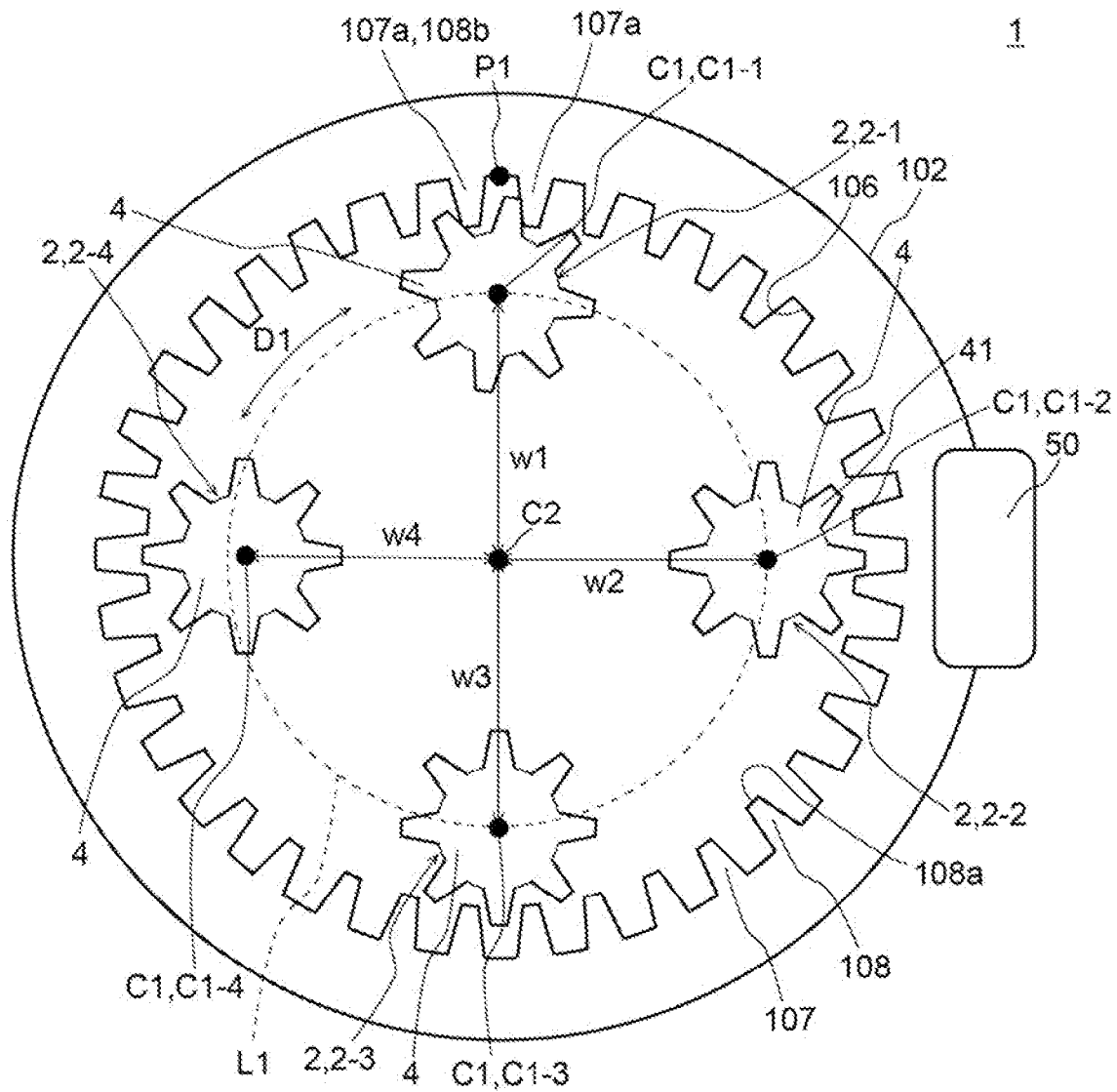
FIG. 6 is a top view illustrating the measurement step according to the embodiment.

In the first measurement step, the pinion 4 of the one drive device 2 is aligned to face a reference position P1 in the circumferential direction D1 of the ring gear 106. The backlash between the one drive device 2 and the ring gear 106 is then measured. In the embodiment, the backlash between the first drive device 2-1 and the ring gear 106 is measured in the first measurement step. FIGS. 5 and 6 show the state of the drive mechanism 1 in which the pinion 4 of the first drive device 2-1 is aligned to face the reference position P1.

In the second measurement step, the plurality of drive devices 2 are revolved relative to the ring gear 106. By rotating the drive devices, the pinion 4 of the other drive device 2 different from the drive device 2 whose backlash has been measured is aligned to face the reference position P1 of the ring gear 106. Then, the backlash between the other drive device 2 and the ring gear 106 is measured. In the embodiment, the backlash between the second drive device 2-2 and the ring gear 106 is measured in the second measurement step.

When the drive mechanism 1 has n drive devices 2, the measurement step may further include (n−2) steps, which are from the third measurement step to the nth measurement step, to perform measurements of backlashes of the drive devices 2 that have not been measured in the first measurement step and the second measurement step. In the each step from the third to nth measurement steps, the pinion 4 of the drive device 2 with which the backlash has not been measured is aligned to face the reference position P1 of the ring gear 106. Subsequently, the backlash between the drive device 2 that now faces the reference position P1 and the ring gear 106 is measured. Since the measurement step includes the n steps, which are from the first to nth measurement steps, the backlash between each of the plurality of drive devices 2 and the ring gear 106 can be measured.

As an example of a method of measuring the backlash in each of the first to nth measurement steps, how to measure the backlash between the first drive device 2-1 and the ring gear 106 in the first measurement step will be described more specifically with reference to FIGS. 5 and 6. The following description of the method of measuring the backlash between the first drive device 2-1 and the ring gear 106 in the first measurement step is also applicable to a method of measuring the backlash between the corresponding drive device 2 and the ring gear 106 in the second to nth measurement steps.

The plurality of drive devices 2 are first revolved relative to the ring gear 106, and the pinion 4 of the drive device 2 that is to be measured is aligned to face the reference position P1 of the ring gear 106 as shown in FIG. 5. More specifically, the pinion 4 is arranged such that one of the teeth 41 of the pinion 4 of the drive device 2 to be measured is situated between a pair of reference teeth 107a of the ring gear 106. Here, the pair of reference teeth 107a includes the tooth 107 closest to the reference position P1 in the circumferential direction D1 and the tooth second closest to the reference position P1 among the teeth 107 of the ring gear 106.

Here, among the plurality of internal teeth 108, the internal tooth 108 whose tip 108a is located at the closest distance from the rotation center C2 of the ring gear 106 is also referred to as an innermost internal tooth 108b. In the embodiment, the reference position P1 is determined such that the innermost internal tooth 108b is one of the pair of reference teeth 107a. In other words, in the embodiment, the innermost internal tooth 108b and one of the inner teeth 108 adjacent to the innermost internal tooth 108b in the circumferential direction D1 among the inner teeth 108 are referred to as the pair of reference teeth 107a. In other words, in this embodiment, the position where the pinion 4 engages with the internal tooth 108 (innermost internal tooth) whose tip 108a is located at the closest distance from the rotation center C2 of the ring gear 106 among the plurality of internal teeth 108 is used as the reference position P1 to measure the backlash. As an example, the reference position P1 is defined between the innermost internal tooth 108b and the internal tooth with the tip 108a closer to the rotation center C2 of the ring gear 106 among the two internal teeth 108 adjacent to the innermost internal tooth 108b in the circumferential direction D1.

The following advantageous effects can be obtained by determining the reference position P1 in the ring gear 106 having the plurality of internal teeth 108 as described above. If the backlash between the pinion 4 and the ring gear 106 becomes too small, the rotation of the pinion 4 may be inhibited by interference between the teeth 41 of the pinion 4 and the internal teeth 108 of the ring gear 106. The backlash between the pinion 4 and the ring gear 106 is smallest when the pinion 4 is situated at the position in the circumferential direction D1 where it engages the innermost internal tooth 108b. In consideration of this, the reference position P1 is determined as described above, and the backlash is measured in the measurement step with reference to the state where the pinion 4 engages the innermost internal tooth 108b. Based on the backlash measured in this way, the determination step and adjustment step described later are performed. Therefore, it is possible to prevent the backlash between the pinion 4 and the innermost internal tooth 108b from becoming too small after the position of the pinion 4 is adjusted in the adjustment step.

An example of a method of revolving the plurality of drive devices 2 relative to the ring gear 106 is described below. In the embodiment, the plurality of drive devices 2 are attached to the nacelle 103 and the ring gear 106 is formed on the tower 102. Thus, the plurality of drive devices 2 can be revolved relative to the ring gear 106 by rotating the nacelle 103 relative to the tower 102 by the plurality of drive devices 2.

After bringing the pinion 4 of the drive device 2 subject to backlash measurement to face the reference position P1 of the ring gear 106, the rotation axis C1 of the pinion 4 is fixed in position with reference to the ring gear 106. In this embodiment, the relative position of the rotation axis C1 of the pinion 4 can be fixed by fixing the relative position of the nacelle 103 to which the drive devices 2 are attached and the tower 102 on which the ring gear 106 is formed. The relative position of the nacelle 103 and the tower 102 can be fixed, for example, by applying a braking force to the ring gear 106 using a brake that is attached to the nacelle 103 and has the friction member 50.

As shown in FIG. 5, the tooth 41 of the pinion 4 situated at the reference position P1 and situated between the pair of reference teeth 107a adjacent to each other in the circumferential direction D1 of the ring gear 106 is made in contact with one of the pair of reference teeth 107a. Subsequently, the actuator 30 causes the pinion 4 to rotate, and the pinion 4 is rotated until the pinion tooth 41 comes into contact with the other of the pair of reference teeth 107a as shown in FIG. 6. The amount of rotation outputted by the actuator 30 until the pinion tooth 41 comes into contact with the other of the pair of reference teeth 107a is measured. As an example, the rotation can be outputted by the actuator 30 by manually inputting rotation to the actuator 30. In this case, the amount of rotation outputted by the actuator 30 can be measured by visually counting the number of rotations inputted to the actuator 30 by a human hand. Alternatively, a pulse counter may be used to measure the amount of rotation outputted by the actuator 30. Further, a torque meter may be used to detect the contact of the tooth 41 of the pinion 4 with one of the pair of reference teeth 107a as shown in FIG. 5 or the contact of the tooth 41 of the pinion 4 with the other of the pair of reference teeth 107a as shown in FIG. 6. In this case, by measuring the torque applied to the rotating pinion 4 with the torque meter and detecting that a large torque is applied to the pinion 4, it is possible to detect the contact of the tooth 41 of the pinion 4 with the reference tooth 107a.

Based on the amount of rotation outputted by the actuator 30 from when the tooth 41 of the pinion contacts the one of the pair of reference teeth 107a to when the tooth 41 of the pinion contacts the other of the pair of reference teeth 107a, the backlash between the drive device 2 and the ring gear 106 is calculated.

The backlash between the drive device 2 and the ring gear 106, in particular, a circumferential backlash between the pinion 4 and the ring gear 106, may be calculated from the measured rotation amount outputted by the actuator 30, a backlash inside the speed reducer 32, and a reduction ratio of the speed reducer 32. The determination step and the adjustment step described later can be performed based on the calculated backlash between the pinion 4 and the ring gear 106. In particular, the positions of the plurality of drive devices 2 can be determined and adjusted based on an absolute value of the actual backlash between the pinion 4 and the ring gear 106, excluding the influence of the backlash inside the speed reducer 32 and the reduction ratio of the speed reducer 32 from the amount of rotation outputted by the actuator 30.

Further, the measurement result itself of the amount of rotation outputted by the actuator 30 from when the tooth 41 of the pinion contacts one of the pair of reference teeth 107a to when the tooth 41 of the pinion contacts the other of the pair of reference teeth 107a may be used as the backlash between the drive device 2 and the ring gear 106. Generally, the speed reducers 32 included in the plurality of drive devices 2 provided in the drive mechanism 1 are all of the same type, the backlash inside the speed reducer 32 and the reduction ratio of the speed reducer 32 are considered to be the same between the plurality of drive devices 2. Based on this, a backlash between the ring gear 106 and the pinion 4 of the drive device 2 to which a larger amount of rotation outputted by the actuator 30 is considered to be larger, whereas a backlash between the ring gear 106 and the pinion 4 of the drive device 2 to which a smaller amount of rotation outputted by the actuator 30 is considered to be smaller. Therefore, by comparing the amount of rotation outputted by the actuator 30 for each of the plurality of drive devices 2, the magnitude of the backlash between the pinion 4 and the ring gear 106 can be compared. For example, in the determination step described later, the drive device 2 whose backlash between its pinion 4 and the ring gear 106 is significantly different from the other drive devices 2 can be identified by comparing the amount of rotation outputted by the actuator 30. In this way, the amount of rotation itself outputted by the actuator 30 can be used as an alternative value for the backlash between the pinion 4 and the ring gear 106.

By using the amount of rotation outputted by the actuator 30 as the backlash between the drive device 2 and the ring gear 106, it is not necessary to calculate the absolute value of the backlash between the pinion 4 and the ring gear 106 in consideration of the backlash inside the speed reducer 32 and the reduction ratio of the speed reducer 32.

The obtainment step will now be described. In the obtainment step, variation information regarding the variation among the distances from the tips of the plurality of teeth 107 to the rotation center C2 of the ring gear 106 is obtained as described above. The variation among the distances from the rotation center C2 of the ring gear 106 to the tips of the plurality of teeth 107 is caused, for example, due to distortion of the shape of the ring gear 106. The obtainment step may be performed after or before the measurement step. When the obtainment step is performed before the measurement step, the innermost internal tooth 108b and reference position P1 may be identified based on the variation information obtained in the obtainment step, and the measurement step may be performed based on the identified innermost internal tooth 108b and reference position P1.

As an example, in the obtainment step, the variation information regarding a variation among the distances from the rotation center C2 of the ring gear 106 to the tips of the plurality of teeth 107 is obtained from at least one selected from the group consisting of information regarding a manufacturing tolerance of the ring gear 106, backlashes between a specific drive device 2 and the ring gear 106 measured at different circumferential positions of the ring gear 106, and inspection result regarding the distortion of the ring gear 106 in the circumferential direction D1. This allows the variation information to be obtained based on readily available information. In the determination step described below, the positions of the drive devices 2 with reference to the ring gear 106 can be accurately determined by considering the variation information, especially the positions of the pinions 4 of the drive devices 2 with reference to the ring gear 106.

In the obtainment step, how to obtain the variation information regarding a variation among the distances from the rotation center C1 of the ring gear 106 to the tips of the plurality of teeth 107 from a backlash between the specific drive device 2 and the ring gear 106 measured at different circumferential positions of the ring gear 106 is described.

First, select a specific drive 2 from among the plurality of drive devices 2. For example, select the first drive 2-1 as the specific drive device 2 from among the plurality of drive devices 2.

Next, the selected specific drive device 2 is moved to face the first position in the circumferential direction D1 of the ring gear 106 to measure the backlash between the specific drive device 2 and the ring gear 106. The method of measuring the backlash in this obtainment step is the same as, for example, the method of measuring the backlash in the measurement step. The plurality of drive devices 2 are revolved relative to the ring gear 106 to bring the selected specific drive device 2 to face at a second position (different from the first position) in the circumferential direction D1 of the ring gear 106. The backlash between the specific drive device 2 and the ring gear 106 at the second position is then measured. In this way, the backlashes between the specific drive device 2 and the ring gear 106 can be measured at two or more different circumferential positions of the ring gear 106.

Here, the greater a variation between the backlashes measured at the two or more different circumferential positions of the ring gear 106, the greater the variation among the distances from the rotation center C1 of the ring gear 106 to the respective tips of the plurality of teeth 107. When the ring gear 106 has the internal teeth 108, it is considered that the larger the backlash measured at a particular circumferential position of the ring gear 106, the shallower the teeth 41 of the pinion 4 of the drive device 2 are engaged with the internal teeth 108 of the ring gear 106 at that circumferential position. Therefore, it is considered that the larger the backlash measured at this circumferential position of the ring gear 106, the larger the distance from the tip 108a of the internal tooth 108 situated at this circumferential position to the rotation center C2. As discussed above, it is possible to obtain the variation information regarding a variation among the distances from the rotation center C1 of the ring gear 106 to the tips of the plurality of teeth 107 by measuring backlashes between the specific drive device 2 and the ring gear 106 at different circumferential positions of the ring gear 106.

Specifically, the backlash values themselves measured at different circumferential positions can be obtained as the variation information regarding the variation among the distances from the rotation center C1 of the ring gear 106 to the tips of the plurality of teeth 107. Alternatively or in addition, information derived based on the measured backlash values may be used as the variation information. For example, the distances from the rotation center C2 to the tips of the tooth 107 situated at the different circumferential positions may be calculated based on the measured backlash values, and this may be obtained as the variation information.

After the measurement step and the obtainment step, the determination step of determining about the positions of the drive devices 2 with reference to the ring gear 106 is performed based on the two or more backlashes measured in the measurement step. As an example, in the determination step, in particular, it is determined whether the variation among the positions of the plurality of drive devices 2 with reference to the ring gear 106 is acceptable or not in the viewpoint that the variation among the backlashes between the ring gear 106 and the plurality of drive devices 2 becomes sufficiently small. In addition, when the variation among the positions of the plurality of drive devices 2 is unacceptably large, it may be determined which drive device 2 is displaced from the other drive devices 2 at the positions of the plurality of drive devices 2. Specifically, in the determination step, it may be determined which drive device 2 has a largely different value of the distance from the rotation center C2 of the ring gear 106 to the rotation axis C1 from those of the other drive devices 2. Further, it may determine the degree of deviation of the distance from the rotation center C2 to the rotation axis C1 of the drive device 2 that has been determined to have a larger positional deviation than those of the other drive device 2 compared to the distance(s) from the rotation center C2 to the rotation centers C1 of the other drive devices 2.

In the determination step, as an example, when the variation among the backlashes between the plurality of drive devices 2 and the ring gear 106 is equal to or less than a reference value, it may be evaluated that the variation among the positions of the drive devices 2 with reference to the ring gear 106 is sufficiently small and the positional adjustment of the plurality of drive devices 2 is unnecessary. Whereas when the variation among the backlashes between the plurality of drive devices 2 and the ring gear 106 is greater than the reference value, it is evaluated that the variation among the positions of the drive devices 2 with reference to the ring gear 106 is too large and the positional adjustment of the plurality of drive devices 2 is necessary.

As an example, in the determination step, determination about the position(s) of the drive device(s) 2 with reference to the ring gear 106 is performed based on the backlashes measured in the measurement step and the variation information obtained in the obtainment step. The position(s) of the drive device(s) 2 with reference to the ring gear 106 can be determined in consideration of the variation among the distances from the rotation center C2 of the ring gear 106 to the tips of the plurality of teeth 107 caused by the distortion of the shape of the ring gear 106. For example, when the variation among the backlashes between the plurality of drive devices 2 and the ring gear 106 is not large as a whole because the distortion of the shape of the ring gear 106 is small although the variation among the positions of the plurality of drive devices 2 is relatively large, it may be determined that adjustment of the position(s) of the drive device(s) 2 is unnecessary in the determination step. In this way, it is possible to avoid unnecessary adjustment and thereby the amount of work for position adjustment can be reduced. Further, in this case, the reference value for showing the degree of the variation among the positions of the drive devices 2 with reference to the ring gear 106 may be set as a value that varies according to the variation information obtained in the obtainment step.

As an example, a relative standard deviation of the backlashes measured in the measurement step can be used as a numerical value indicating the degree of backlash variation. In the case where the determination step is performed in consideration of the variation information obtained in the obtainment step, a relative standard deviation of the distances from the rotation center C1 of the ring gear to the respective tips of the plurality of teeth 107, which has been obtained in the obtainment step, can be used as the variation information. In this case, the determination step includes a step of evaluating the degree of variation among the positions of the drive devices 2 with reference to the ring gear 106 (hereinafter also referred to as relative standard deviation evaluation step) based on the relative standard deviation of the backlashes, and the relative standard deviation of the distances from the rotation center C1 of the ring gear 106 to the respective tips of the plurality of teeth 107. In the relative standard deviation evaluation step, the degree of variation among the positions of the drive devices 2 with reference to the ring gear 106 can be evaluated, for example, by the following method. A sum baseline value is predetermined, which is the baseline for the sum of the relative standard deviation of the backlashes and the relative standard deviation of the distances from the rotation center C1 of the ring gear 106 to the tips of the plurality of teeth 107. The relative standard deviation of the distances from the rotation center C1 of the ring gear 106 to the tips of the plurality of teeth 107 obtained in the obtainment step is subtracted from the sum baseline value, and the resulting value is set as a reference value of the relative standard deviation of the backlashes measured in the measurement step. When the relative standard deviation of the backlashes measured in the measurement step is larger than the reference value, it is evaluated that the degree of variation among the positions of the drive devices 2 with reference to the ring gear 106 is too large. Whereas when the relative standard deviation of the backlashes measured in the measurement step is equal to or less than the reference value, it is evaluated that the degree of variation of the positions of the drive devices 2 with reference to the ring gear 106 is sufficiently small.

The relative standard deviation evaluation step makes it possible to easily evaluate the degree of variation among the positions of the drive devices 2 with reference to the ring gear 106. In particular, by using the relative standard deviation, the evaluation criteria can be quantitatively determined, and the evaluation can be performed in consideration of the variation information obtained in the obtainment step together with the backlashes measured in the measurement step.

For the plurality of drive devices 2 shown in FIG. 4, when determination about the positions of the drive devices 2 with reference to the ring gear 106 is performed in the determination step, for example, the following determination result can be obtained. Since the degree of variation among the backlashes between the plurality of drive devices 2 and the ring gear 106 exceeds the reference value, it is determined that the degree of variation among the positions of the drive devices 2 with reference to the ring gear 106 is too large. The backlash between the fourth drive device 2-4 and the ring gear 106 is larger than the backlashes of the other drive devices 2-1, 2-2, and 2-3 mating with the ring gear 106 so that it is determined that the distance w4 in FIG. 4 is smaller than the distances w1, w2, and w3. Moreover, may also obtained is the determination result indicating how the distance w4 shown in FIG. 4 should be changed to reduce the degree of variation among the backlashes between the plurality of drive device 2 and the ring gear 106 to less than the reference value.

In the determination step, the position(s) of the drive device(s) 2 with reference to the ring gear 106 may be determined based only on the backlashes measured in the measurement steps, without considering the variation information obtained in the obtainment step. In this case, the reference value for the degree of variation among the positions of the drive devices 2 with reference to the ring gear 106 may be a fixed value that does not vary and is independent from the variation information obtained in the obtainment step.

After the determination step, the adjustment step is performed to adjust the position(s) of the drive device(s) 2 based on a result of the determination step. In the adjustment step, the position(s) of the pinion(s) 4 of the drive device(s) 2 is adjusted based on the result of the determination step. As an example, the adjustment step is performed when the degree of the position variation among the plurality of drive devices 2 with reference to the ring gear 106 is determined to be unacceptably large in the determination step.

For example, if the determination step is to be performed again after the adjustment step, the positions of the drive devices 2 are adjusted in the adjustment step so that the degree of the position variation among the drive devices 2 with reference to the ring gear 106 is determined to be acceptably small. For example, in the adjustment step, the position(s) of the pinion(s) 4 is adjusted so that the degree of variation among the backlashes between the drive devices 2 and the ring gear 106 becomes less than a reference value. As an example, the reference value used in the adjustment step may be the same as the reference value used in the determination step to determine the degree of position variation among the drive devices 2 with reference to the ring gear 106. That is, the reference value in the adjustment step may be a value that varies according to the variation information obtained in the obtainment step or a fixed value that does not vary. By adjusting the position(s) of the pinion(s) 4 so that the variation among the backlashes between the plurality of drive devices 2 and the ring gear 106 becomes less than the reference value, the backlash variation can be sufficiently reduced.

As an example, the adjustment step performed in the case where the positions of the drive devices 2 with reference to the ring gear 106 vary as shown in FIG. 4 will be described. In the example shown in FIG. 4, the distance w4 between the rotation axis C1-4 of the pinion 4 of the fourth drive device 2-4 and the rotation center C2 of the ring gear 106 is smaller than the distances w1, w2, and w3 between the rotation axes C1-1, C1-2, C1-3 of the pinions 4 of the other drive devices 2-1, 2-2, 2-3 and the rotation center C2 of the ring gear 106 as described above. Thus the degree of position variation among the plurality of drive devices 2 with reference to the ring gear 106 is increased.

Figure 7:
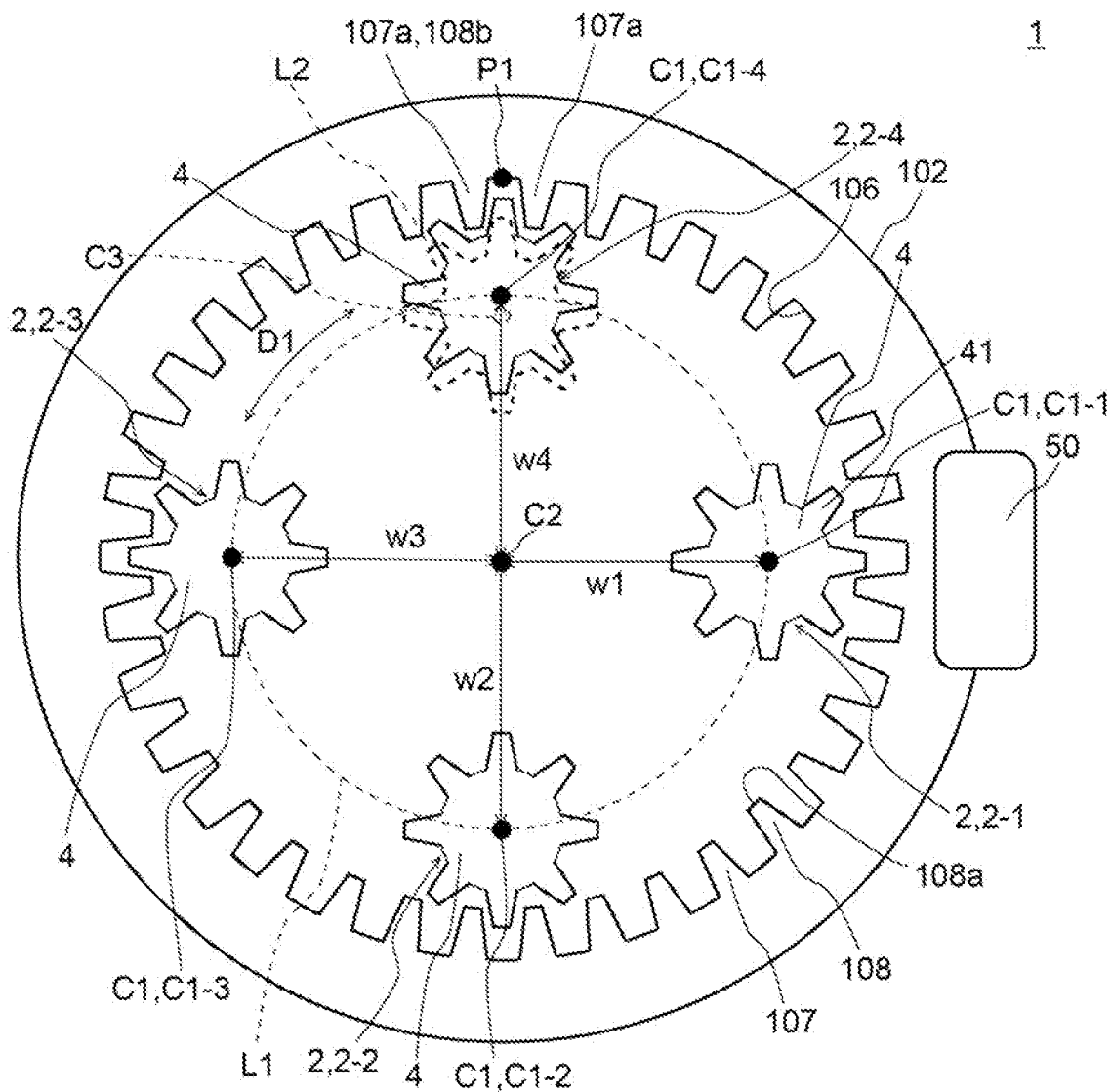
FIG. 7 is a top view illustrating an adjustment step according to the embodiment.

When the condition such as the one shown in FIG. 4 is found from the result of the determination step, the position of the pinion 4 of at least one of the drive devices 2 may be adjusted in the adjustment step to change the distance from the rotation center C2 of the ring gear 106 as shown in FIG. 7. In particular, the position of the rotation axis C1 of the pinion 4 of at least one of the plurality of drive devices 2 can be adjusted to change its distance from the rotation center C2 of the ring gear 106. This can reduce the variation among the positions of the plurality of drive devices 2 with reference to the ring gear 106 compared to the variation before the adjustment step. The single-dotted line labeled with L2 in FIG. 7 is a hypothetical line indicating the position of pinion 4 before it is moved in the adjustment step. The dashed circle labeled with C3 in FIG. 7 is a circle indicating the position of the rotation axis C1 of the pinion 4 before it is moved in the adjustment step.

In the example of FIG. 7, the position of the rotation axis C1-4 of the pinion 4 of the fourth drive 2-4 is adjusted such that the distance from the rotation center C2 of the ring gear 106 becomes larger than that of FIG. 4 before the adjustment step. This adjustment results in a smaller position variation among the plurality of drive devices 2 with reference to the ring gear 106 than that of the state illustrated in FIG. 4 before the adjustment step.

In the adjustment step, the position adjustment of the pinion 4 of at least one of the plurality of drive devices 2 may be performed while fixing the position(s) of the pinion (s) 4 of the drive devices 2 different from the drive device 2 for which the position adjustment of the pinion 4 is performed. In particular, the position adjustment of the pinion 4 of the drive device 2 may be performed while fixing the positions of the pinions 4 of the rest of the drive devices 2 other than the drive device 2 for which the position adjustment of the pinion 4 is made. For example, when adjusting the position of the pinion 4 of the fourth drive 2-4 as described above, the position adjustment may be performed while the positions of the pinions 4 of the drive devices 2-1, 2-2, and 2-3 other than the fourth drive 2-4 are fixed. By performing the position adjustment in this manner, only the position of the pinion 4 whose position is undesirable can be adjusted while preventing the positions of the pinions 4 other than the pinion 4 for which the position adjustment is performed from being changed. In this way, it is possible to reduce the amount of work for position adjustment. Fixing the positions of the drive devices 2 other than the drive device 2 for which the position of the pinion 4 is adjusted can be performed, for example, by applying a brake to the rotation of the shaft 33 using the respective brake units 31 of the drive devices 2.

In the adjustment step, the positions of the drive devices 2 may be adjusted by moving the drive devices 2 relative to the ring gear 106 without changing the relative positional relationships between the drive devices 2. Such position adjustment can be performed, for example, by adjusting the position of the nacelle 103 to which the plurality of drive devices 2 are attached, relative to the tower 102 on which the ring gear 106 is formed.

Such an adjustment step can sufficiently reduce the position variation among the drive devices 2 with reference to the ring gear 106. In particular, by performing the adjustment step based on a result of the determination step described above, the position variation among the drive devices 2 with reference to the ring gear 106 can be made sufficiently small while reducing the amount of position adjustment work.

According to the method of determining about the positions of the plurality of drive devices 2 of the drive mechanism 1 described above and the method of adjusting the positions of the drive devices 2 described above, the positions of the plurality of drive devices 2 with reference to the ring gear 106 are determined by a simple method. Based on a result of such determination, the position(s) of the plurality of drive devices 2, especially the position(s) of the pinion(s) 4, can be adjusted.

Figure 8:
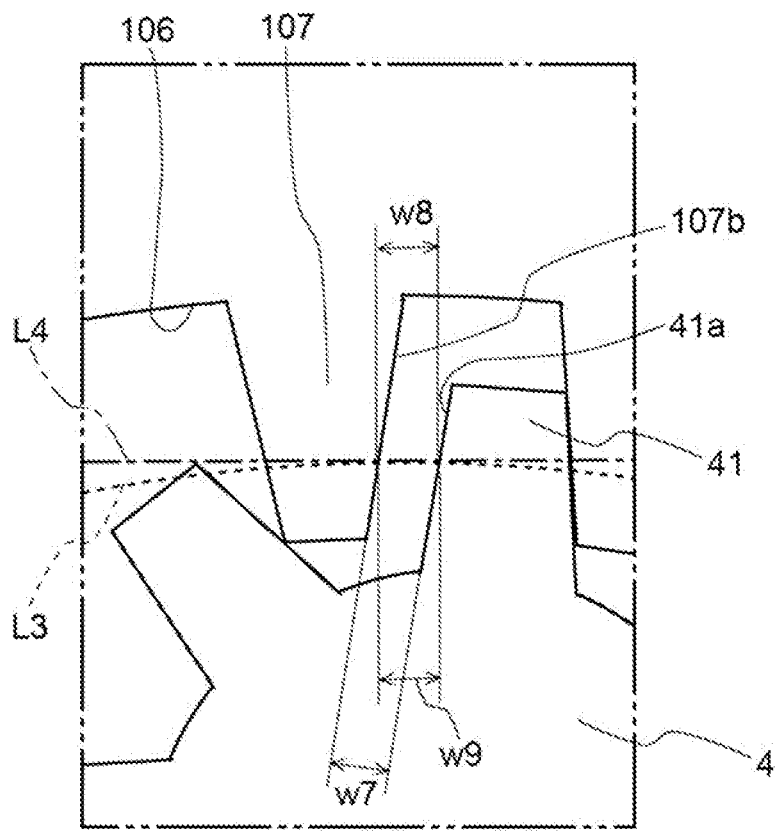
FIG. 8 is an enlarged partial top view of the drive mechanism according to the embodiment.

Advantageous effects obtained through the method of determining the positions of the plurality of drive devices 2 of the drive mechanism 1 described above and the method of adjusting the positions of the drive devices 2 will now be described with reference to FIG. 8. FIG. 8 is an enlarged view of a portion of the drive mechanism 1 of FIG. 4, where the teeth 107 of the ring gear 106 and the teeth 41 of the pinion 4 are meshed with each other. The curve L3 shown in FIG. 8 as a dashed line indicates a part of a virtual circle centered on the rotation center C2 of the ring gear 106. In FIG. 8, the line L4 shown as a single point chain line is a tangent line to the curve L3.

Another method may alternatively be applicable as the method of adjusting the drive mechanism 1 that drives a movable portion, especially the drive mechanism 1 that drives the movable portion of the wind turbine 10 as shown in FIG. 1, and includes the ring gear 106 and the plurality of drive devices 2 as shown in FIG. 4. In this method, first, measure a backlash by directly measuring the length of the gap between the tooth 107 of the ring gear 106 and the tooth 41 of the pinion 4, which are meshing as shown in FIG. 8. Here, in measuring backlash, for example, a gap gauge is inserted into the gap between a tooth surface 107b of the tooth 107 of the ring gear 106 and a tooth surface 41a of the pinion 4 to measure a backlash w7 in the normal direction or a backlash w8 in the tangential direction. The position of the drive device 2 with reference to the ring gear 106 is determined based on the measured backlash, and the drive mechanism 1 is adjusted based on the determination result. However, in this adjustment method, it is necessary to observe the ring gear 106 and pinion 4 from the direction in which the rotation axes (rotation axis C1, rotation center C2) of the ring gear 106 and pinion 4 extend (perpendicular to the paper surface in FIG. 8) and insert the gap gage from this direction. Therefore, if another member is attached around the ring gear 106 and pinion 4, the member may hamper the backlash measurement. Therefore, this adjustment method may not be applicable to the drive mechanism 1, which is part of the assembled wind turbine 10 as shown in FIG. 1. In addition, lubricant applied between the ring gear 106 and the pinion 4 may hamper the measurement by the gap gauge or the like.

Yet another method of adjusting the drive mechanism 1 is also possible. First, a measuring element of a dial gauge is placed on the tooth surface 41a of the tooth 41 of the pinion 4 while rotating the pinion 4 relative to the fixed ring gear 106. This allows the movement of the tooth surface 41a in the rotational direction of the pinion 4 to be read by the dial gauge to measure a circumferential backlash w9 as shown in FIG. 8. The position of the drive device 2 with reference to the ring gear 106 is determined based on the measured backlash, and the drive mechanism 1 is adjusted based on the determination result. However, this adjustment method requires the dial gauge and work to install the dial gauge. In addition, lubricant applied between the ring gear 106 and the pinion 4 may hamper the installment of the dial gauge and the measurement by the dial gauge.

In contrast, according to the adjustment method of the embodiment, the measurement of backlash can be performed without the need to largely disassemble the object such as the wind turbine 10 in which the drive mechanism 1 is included in order to measure backlashes and to install measuring instruments used for the measurement. In addition, backlashes can be measured without being impeded by lubricant between the ring gear 106 and the pinion 4. Therefore, the determination about the positions of the drive devices 2 relative to the ring gear 106 can be performed by such a simple method. In particular, the positions of the drive devices 2 with reference to the ring gear 106 can be easily determined even in the drive mechanism 1 of the wind turbine 10 that has been installed at the site.

While the foregoing has described the embodiment with reference to specific examples, these specific examples are not intended to limit the embodiment. The foregoing embodiment can be implemented in various other specific forms and is susceptible to omission, replacement, and modification of various elements thereof within the purport of the invention.

With reference to the appended drawings, the following describes a modification example. In the following description and the drawings used therein, parts that can be configured in a similar manner to those in the foregoing specific example are denoted by the same reference signs as those in the foregoing specific example and are not described again.

Modification Example

Figure 9:
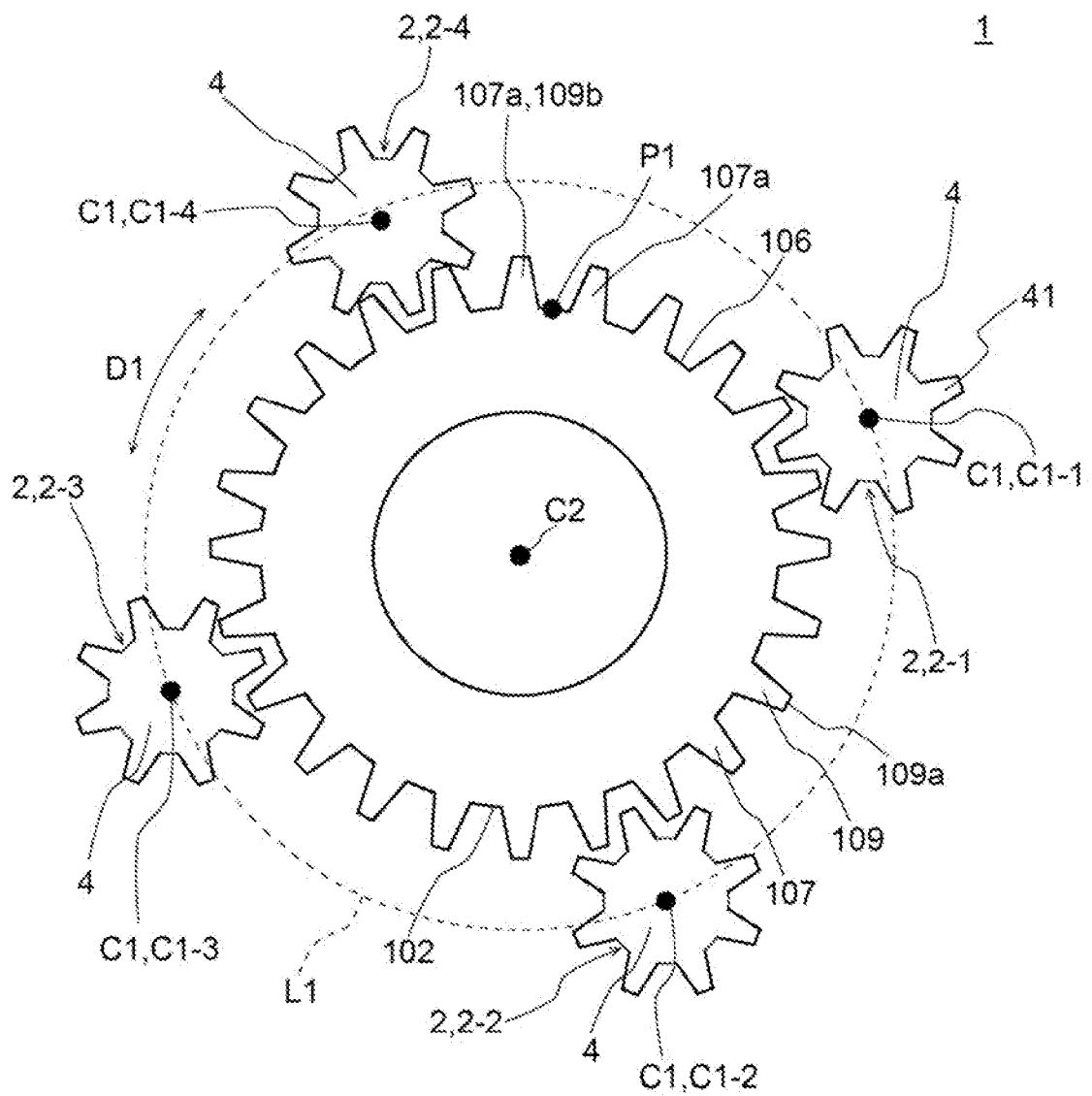
FIG. 9 is a top view of a drive mechanism of a modification example.

The above embodiment described the method of determining the positions of the plurality of drive devices 2 and the method of adjusting the position(s) of the drive device(s) 2 in the drive mechanism 1 with the ring gear 106 having the plurality of internal teeth 108. However, the type of the ring gear 106 is not limited to this. FIG. 9 is a top view of the drive mechanism 1 with the ring gear 106 of a modification example. In the example of FIG. 9, the ring gear 106 has a plurality of external teeth 109. In the example of FIG. 9, the ring gear 106 is formed in a shape of a distorted annulus on which the plurality of external teeth 109 are provided. The external teeth 109 of the ring gear 106 and the teeth 41 of the pinion 4 mesh with each other. The friction member 50 is not shown in FIG. 9.

When the ring gear 106 has the plurality of external teeth 109, the backlash between the drive device 2 and the ring gear 106 is increased when the pinion 4 of the drive device 2 meshes with the external tooth 109 having a tip 109a closer to the rotation center C2 of the ring gear 106. In contrast, the backlash between the drive device 2 and the ring gear 106 is decreased when the pinion 4 of the drive device 2 meshes with the external tooth 109 having the tip portion 109a more distant from the rotation center C2 of the ring gear 106.

Here, among the plurality of external teeth 109, the external tooth 109 whose tip 109a is located most distant from the rotation center C2 of the ring gear 106 is also referred to as an outermost external tooth 109b. In the modification example, the reference position P1 is determined such that the outermost external tooth 109b is one of the pair of reference teeth 107a. In other words, in this modification example, the outermost external tooth 109b and one of the external teeth 109 adjacent to the outermost external tooth 109b in the circumferential direction D1 among the external teeth 109 are referred to as the pair of reference teeth 107a. In other words, in this embodiment, the position where the pinion 4 engages with the external tooth 109 (outermost external tooth) whose tip 109a is located most distant from the rotation center C2 of the ring gear 106 among the plurality of external teeth 109 is used as the reference position P1 to measure the backlash. As an example, the reference position P1 is defined between the outermost external tooth 109b and the external tooth with the tip 109a closer to the rotation center C2 of the ring gear 106 among the two internal teeth 109 adjacent to the outermost external tooth 109b in the circumferential direction D1.

The following advantageous effects can be obtained by determining the reference position P1 in the ring gear 106 having the plurality of external teeth 109 as described above. The backlash between the pinion 4 and the ring gear 106 is smallest when the pinion 4 is situated at the position in the circumferential direction D1 where the pinion 4 engages with the outermost external tooth 109b. In consideration of this, the reference position P1 is determined as described above, and the backlash is measured in the measurement step with reference to the state where the pinion 4 engages the outermost external tooth 109b. Based on the backlash measured in this way, the determination step and adjustment step described later are performed. Therefore, it is possible to prevent the backlash between the pinion 4 and the outermost external tooth 109b from becoming too small after the position of the pinion 4 is adjusted in the adjustment step.

The description of the internal teeth 108 and the innermost internal tooth 108b of the ring gear 106 in the above embodiment is also applicable to the external teeth 109 and the outermost external tooth 109b of the ring gear 106 of the modification example, as long as there is no contradiction.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

Aspects of the present invention are not limited to the foregoing individual embodiments and embrace various modifications conceivable by those skilled in the art. Advantageous effects of the present invention are also not limited to those described above. That is, various additions, changes, and partial deletions are possible in a range of not departing from the conceptual ideas and spirit of the present invention derived from contents defined in the claims and the equivalents thereof

What is claimed is:

1. A method of adjusting a drive mechanism for driving a movable portion of a wind turbine, the drive mechanism including a ring gear and a plurality of drive devices, each of the plurality of drive devices including a pinion that meshes with the ring gear and a drive unit that drives the pinion, the method comprising:
a measurement step of measuring backlashes between the ring gear and the plurality of drive devices;
a determination step of determining the positions of the plurality of drive devices with reference to the ring gear based on the backlashes measured in the measurement step; and
an adjustment step of adjusting a position of the pinion based on a result of the determination step,
wherein the measurement step includes at least:
aligning the pinion of one of the plurality of drive devices to face a reference position in a circumferential direction of the ring gear and measuring a backlash between the ring gear and the said one of the plurality of drive devices whose pinion faces the reference position; and
aligning the pinion of another one of the plurality of drive devices to face the reference position of the ring gear by revolving the plurality of the drive devices relative to the ring gear, the said another one of the plurality of drive devices being different from the said one of the plurality of drive devices whose backlash has been measured, and measuring a backlash between the ring gear and the said another one of the plurality of drive devices whose pinion faces the reference position.

2. The method according to claim 1, further comprising an obtainment step of obtaining variation information regarding a variation among distances from a rotation center of the ring gear that has a plurality of teeth to respective tips of the plurality of teeth,
wherein, in the determination step, the determination about the positions of the plurality of drive devices with reference to the ring gear is performed based on the backlashes measured in the measurement step and the variation information obtained in the obtainment step.

3. The method according to claim 2, wherein the determination step includes evaluating a degree of variation among the positions of the plurality of drive devices with reference to the ring gear based on a relative standard deviation of the backlashes measured in the measurement step and a relative standard deviation of the distances from the rotation center of the ring gear to the respective tips of the plurality of teeth obtained in the obtainment step.

4. The method according to claim 2, wherein, in the obtainment step, the variation information regarding the variation among the distances from the rotation center of the ring gear to the respective tips of the plurality of teeth is obtained from at least one selected from the group consisting of information regarding a manufacturing tolerance of the ring gear, the backlash between a specific drive device and the ring gear measured at different circumferential positions of the ring gear, and an inspection result regarding a circumferential distortion of the ring gear.

5. The method according to claim 1, wherein the ring gear has a plurality of internal teeth,
wherein, in the measurement step, the backlashes are measured using, as a reference position, a position where the pinion engages with an internal tooth whose tip is located at the closest distance from a rotation center of the ring gear among the plurality of internal teeth.

6. The method according to claim 1, wherein the ring gear has a plurality of external teeth,
wherein, in the measurement step, the backlashes are measured using, as a reference position, a position where the pinion engages with an external tooth whose tip is located at the furthest distance from a rotation center of the ring gear among the plurality of external teeth.

7. The method according to claim 1, wherein each of the plurality of drive devices includes an actuator that outputs rotation and a speed reducer that decelerates rotation outputted by the actuator and transmits the decelerated output to the pinion, wherein the measurement step includes a step of bringing a tooth of the pinion situated at the reference position and situated between a pair of reference teeth in contact with one of the pair of reference teeth, the pair of reference teeth being adjacent to each other in the circumferential direction of the ring gear, a step of outputting rotation by the actuator to the pinion to rotate the pinion, a step of measuring an amount of rotation outputted by the actuator until when the tooth of the pinion contacts the other of the pair of reference teeth, and a step of calculating the backlash between the pinion and the ring gear from the measured rotation amount, a backlash inside the speed reducer, and a reduction ratio of the speed reducer.

8. The method according to claim 1, wherein, in the adjustment step, the position of the pinion of at least one of the plurality of drive devices is adjusted to change its distance from a rotation center of the ring gear.

9. The method according to claim 1, wherein, in the adjustment step, the position of the pinion is adjusted so that a variation among backlashes between the plurality of drive devices and the ring gear becomes less than a reference value.

10. The method according to claim 1, wherein, in the adjustment step, the position adjustment of the pinion of at least one of the plurality of drive devices is performed while fixing a position of the pinion of another of the plurality of drive devices different from the drive device for which the pinion adjustment of the pinion is performed.

11. A method of adjusting a drive mechanism for driving a movable portion, the drive mechanism including a ring gear and a plurality of drive devices, each of the plurality of drive devices including a pinion that meshes with the ring gear and a drive unit that drives the pinion, the method comprising:
   a measurement step of measuring backlashes between the ring gear and the plurality of drive devices;
   a determination step of determining the positions of the plurality of drive devices with reference to the ring gear based on the backlashes measured in the measurement step; and
   an adjustment step of adjusting a position of the pinion based on a result of the determination step,
   wherein the measurement step includes at least:
   aligning the pinion of one of the plurality of drive devices to face a reference position in a circumferential direction of the ring gear and measuring a backlash between the ring gear and the said one of the plurality of drive devices whose pinion faces the reference position; and
   aligning the pinion of another one of the plurality of drive devices to face the reference position of the ring gear by revolving the plurality of the drive devices relative to the ring gear, the said another one of the plurality of drive devices being different from the said one of the plurality of drive devices whose backlash has been measured, and measuring a backlash between the ring gear and the said another one of the plurality of drive devices whose pinion faces the reference position.

* * * * *